United States Patent Office 3,654,292
Patented Apr. 4, 1972

3,654,292
MANUFACTURE OF 3,5-DICHLORO-2,6-DI-FLUORO - 4 - HYDROXYPYRIDINE AND SALTS THEREOF
Robert Roberts, Runcorn, England, assignor to Imperial Chemical Industries Limited, London, England
No Drawing. Filed Oct. 9, 1969, Ser. No. 865,162
Int. Cl. C07d 31/30
U.S. Cl. 260—297 R         3 Claims

ABSTRACT OF THE DISCLOSURE

A process for the manufacture of 3,5-dichloro-2,6-difluoro-4-hydroxypyridine or salt thereof which comprises the step of interacting 3,5-dichloro-2,4,6-trifluoropyridine and an aqueous solution of a carbonate or bicarbonate of sodium or potassium. The compounds produced by the aforementioned process are known herbicidal agents.

---

This invention relates to the manufacture of 3,5-dichloro-2,6-difluoro-4-hydroxypyridine and salts thereof.

3,5-dichloro-2,6-difluoro-4-hydroxypyridine and salts thereof belong to a class of chlorofluoropyridine derivatives having useful herbicidal properties (as described in the specification of U.K. Pat. No. 1,161,491).

In the specification of U.K. Pat. No. 1,107,882 there is described the production of 3,5-dichloro-2,6-difluoro-4-hydroxypyridine by interacting 3,5-dichlorotrifluoropyridine and aqueous potassium hydroxide.

I have now found that when an aqueous solution of the carbonate or bicarbonate of sodium or potassium is interacted with 3,5-dichloro-2,4,6-trifluoropyridine, the resultant 4-hydroxy derivative may be separated as a colourless product of sufficient purity to obviate the necessity for further purification by recrystallisation.

Thus according to the present invention there is provided a process for the manufacture of 3,5-dichloro-2,6-difluoro-4-hydroxypyridine or a salt thereof which comprises the step of interacting 3,5-dichloro-2,4,6-trifluoropyridine and an aqueous solution of a carbonate or bicarbonate of sodium or potassium.

The sodium or potassium salt of the 4-hydroxy compound is formed in the process.

The free 4-hydroxy compound may be isolated from the reaction product mixture after acidification and if desired may be converted to a salt, which may be the same as or different from the salt formed in the initial process.

The reaction may advantageously be carried out in the presence of a buffering agent, for example sodium formate or sodium acetate.

The reaction may be carried out over a wide range of temperature, but it is preferred to use a temperature in the range from 90° C. to 100° C. This may conveniently be achieved by heating the reaction mixture under reflux.

3,5-dichloro-2,6-difluoro-4-hydroxypyridine may conveniently be separated from the reaction product mixture by acidifying in two stages. At a pH of about 2.5, the main by-product of the reaction, namely the tautomeric 3,5-dichloro-2,4-difluoro-6-pyridone, is precipitated and thereby removed. On further acidification to a pH of about 1.0, the required 4-hydroxy derivative is precipitated.

This invention is illustrated but not limited by the following examples.

EXAMPLE 1

A mixture of 3,5-dichloro-2,4,6-trifluoropyridine (50 g.), sodium carbonate (26.5 g.) and water (250 ml.) was heated whilst stirring under reflux at 94–99° C. for 7 hours. The reaction mixture was cooled and filtered. The filtrate was acidified with dilute hydrochloric acid to a pH of 2.5. The precipitated solid was filtered off and dried to give 7.8 g. of a crude product containing 98% of 3,5-dichloro-2,4-difluoro-pyridone (identified by infra-red spectroscopy, mass spectrometry and nuclear magnetic resonance spectroscopy).

The filtrate, prepared as described above, was further acidified with concentrated hydrochloric acid to a pH of 1.0. The precipitate was filtered off and dried to give 35.8 g. of a crude product containing 97.4% of 3,5-dichloro-2,6-difluoro-4-hydroxypridine, corresponding to a 70.4% yield.

EXAMPLE 2

A mixture of 3,5-dichloro-2,4,6-trifluoropyridine (50 g.), sodium carbonate (26.5 g), sodium formate (4.5 g.) and water (250 ml.) was heated with stirring under reflux at 100° C. for 4 hours and then treated as described in Example 1.

3,5-dichloro-2,6-difluoro-4-hydroxypyridine (40.5 g. of crude product, 98% pure) and 3,5-dichloro-2,4-difluoro-6-pyridone (6.8 g. of crude product, 98% pure) were obtained corresponding to 80.1% yield of the 4-hydroxy derivative.

EXAMPLE 3

A mixture of 3,5-dichloro-2,4,6-trifluoropyridine (50 g.), potassium carbonate (35 g.) and water (250 ml.) was heated with stirring under reflux at 99° C. for two hours and then treated as described in Example 1.

3,5-dichloro-2,6-difluoro-4-hydroxypyridine (37.9 g. of crude product, 99% pure) and 3,5-dichloro-2,4-difluoro-6-pyridone (6.4 g. of crude product, 98% pure) were obtained corresponding to 76.5% yield of the 4-hydroxy derivative.

What I claim is:

1. A process for the manufacture of 3,5-dichloro-2,6-difluoro-4-hydroxypyridine or the sodium or potassium salt thereof which consists essentially of reacting 3,5-dichloro-2,4,6-trifluoropyridine with an aqueous solution of a carbonate or bicarbonate of sodium or potassium at 90° C. up to the boiling point of the reaction mixture, acidifying with a mineral acid to a pH of about 1.0 to precipitate the desired product, filtering and drying.

2. A process as claimed in claim 1 wherein the reaction is carried out in the presence of a buffering agent.

3. A process as claimed in claim 2 wherein the buffering agent is sodium formate.

References Cited
UNITED STATES PATENTS 3,317,542   5/1967   Haszeldine et al. _____ 260—297

FOREIGN PATENTS 1,161,491   8/1969   Great Britain _____ 260—297

OTHER REFERENCES

Chambers et al.: J. Chem. Soc., London, Part 5, 1964, pp. 5634–40.

ALAN L. ROTMAN, Primary Examiner

U.S. Cl. X.R.

71—94